United States Patent
Iyer et al.

(10) Patent No.: US 11,836,163 B1
(45) Date of Patent: Dec. 5, 2023

(54) SYSTEM AND METHOD FOR DATA DRIFT DETECTION TO IMPROVE DATA INTEGRITY FOR DATA WITHIN A DATABASE

(71) Applicant: Fiddler Labs, Inc., Palo Alto, CA (US)

(72) Inventors: Amalendu K. Iyer, Millbrae, CA (US); Bashir Rastegarpanah, Mountain View, CA (US); Joshua G. Rubin, Redwood City, CA (US); Krishnaram Kenthapadi, Sunnyvale, CA (US)

(73) Assignee: Fiddler Labs, Inc., Palo Alto, CA (US)

( * ) Notice: Subject to any disclaimer, the term of this patent is extended or adjusted under 35 U.S.C. 154(b) by 0 days.

(21) Appl. No.: 17/814,727

(22) Filed: Jul. 25, 2022

(51) Int. Cl.
*G06F 16/00* (2019.01)
*G06F 16/28* (2019.01)
*G06F 16/25* (2019.01)

(52) U.S. Cl.
CPC .......... *G06F 16/285* (2019.01); *G06F 16/252* (2019.01); *G06F 16/258* (2019.01)

(58) Field of Classification Search
CPC . G06F 16/285; G06F 16/2264; G06F 16/2237
See application file for complete search history.

(56) References Cited

U.S. PATENT DOCUMENTS

| | | | | |
|---|---|---|---|---|
| 2022/0083815 A1* | 3/2022 | Khanna | ................... | G06F 18/22 |
| 2023/0133127 A1* | 5/2023 | Balabine | ............ | G06F 16/2264 |
| | | | | 707/739 |
| 2023/0186144 A1* | 6/2023 | Lopatecki | ................ | G06N 5/01 |
| | | | | 706/12 |

OTHER PUBLICATIONS

Samuel Kaski, "Dimensionality Reduction by Random Mapping: Fast Similarity Computation for Clustering," 1998, IEEE, pp. 413-418. (Year: 1998).*
Jarodzka et al., "A Vector-Based, Multidimensional Scanpath Similarity Measure," ACM, 2010, pp. 211-218. (Year: 2010).*
Anand. (2020). "Contrastive Self-Supervised Learning." URL: <https://ankeshanand.com/blog/2020/01/26/contrative-self-supervised-learning.html>.
Devlin et al. (2019). "BERT: Pre-training of Deep Bidirectional Transformers for Language Understanding." ArXiv e-prints 1810.04805.
Liu et al. (2021). "Concept Drift Detection via Equal Intensity k-Means Space Partitioning." IEEE Transactions on Cybernetics, vol. 51, No. 6, pp. 3198-3211. doi: 10.1109/TCYB.2020.2983962.
McInnes et al. (2020). "UMAP: Uniform Manifold Approximation and Projection for Dimension Reduction." ArXiv e-prints 1802.03426.

* cited by examiner

*Primary Examiner* — Cheryl Lewis
(74) *Attorney, Agent, or Firm* — Cooley LLP

(57) ABSTRACT

A set of clusters from a first set of vector representations (VRs) is identified. A center associated with each cluster from the set of clusters to generate a set of centers is determined. For each VR from the first set of VRs, and to generate a first set of distributions, a distribution of that VR is determined that indicates, for each center from the set of centers, similarity between that VR and that center. For each VR from a second set of VRs, and to generate a second set of distributions, a distribution of that VR is determined that indicates, for each center from the set of centers, similarity between that VR and that center. A set of divergence metrics associated with the first set of VRs and the second set of VRs are computed based on comparing the first set of distributions and the second set of distributions.

21 Claims, 9 Drawing Sheets

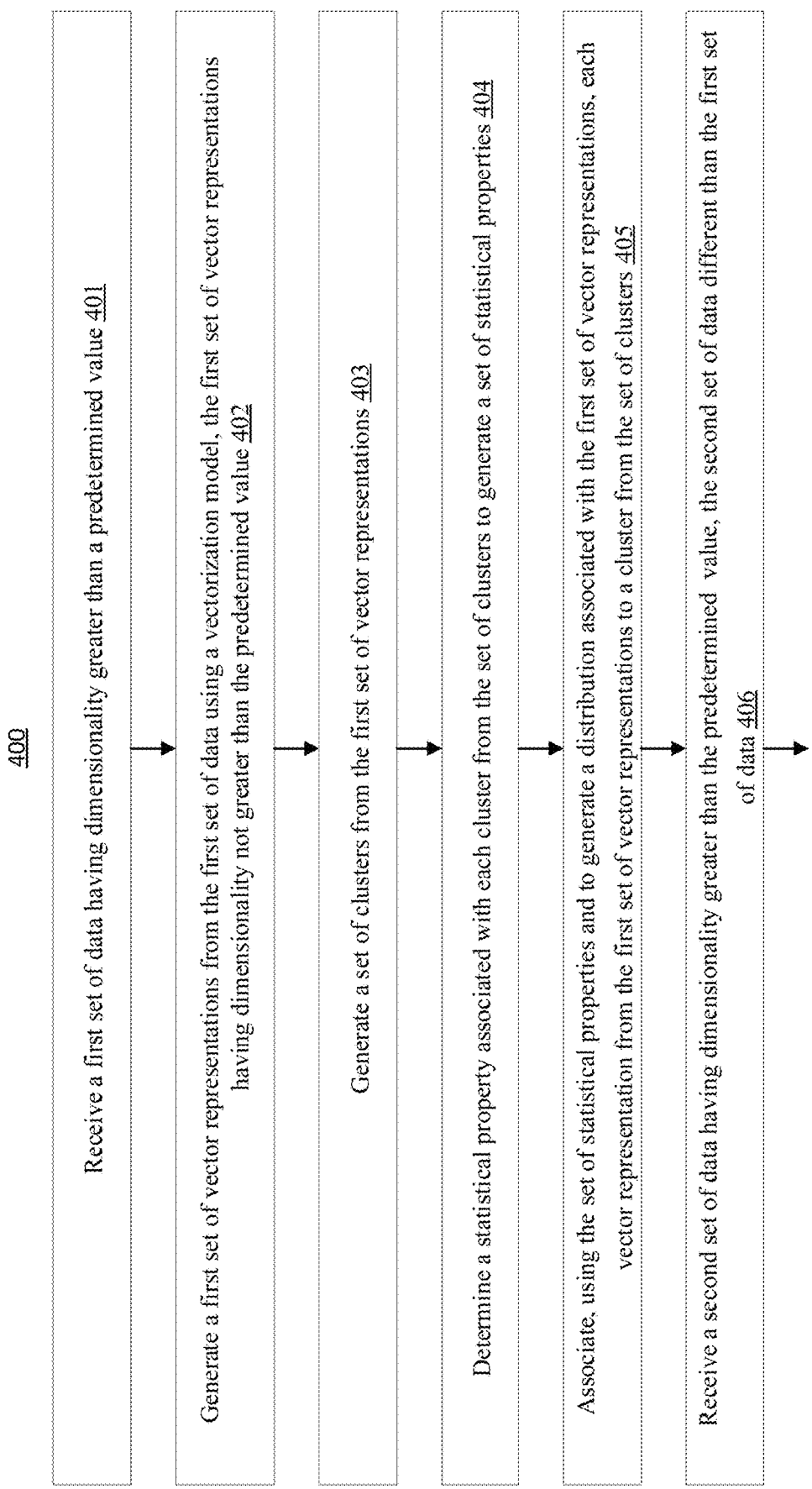

*Continuing from FIG. 4A*

Generate a second set of vector representations from the second set of data using the vectorization model, the second set of vector representations not having dimensionality greater than the predetermined value 407

Associate, using the set of statistical properties and to generate a distribution associated with the second set of vector representations, each vector representation from the second set of vector representations to a cluster from the set of clusters 408

Detect, based on a comparison of the distribution associated with the first set of vector representations with the distribution associated with the second set of vector representations, data drift between the first set of vector representations and the second set of vector representations 409

Cause transmission of a signal to cause a remedial action in response to the data drift exceeding a data drift threshold 410

Generate a set of clusters from a first set of vector representations, the first set of vector representations generated from a first set of data using a vectorization model 501

↓

Determine a statistical property associated with each cluster from the set of clusters to generate a set of statistical properties 502

↓

Associate, using the set of statistical properties and to generate a distribution associated with the first set of vector representations, each vector representation from the first set of vector representations to a cluster from the set of clusters 503

↓

Associate, using the set of statistical properties and to generate a distribution associated with a second set of vector representations, each vector representation from the second set of vector representations to a cluster from the set of clusters, the second set of vector representations different than the first set of vector representations, the second set of vector representations generated from a second set of data different than the first set of data using the vectorization model 504

↓

Compare the distribution associated with the first set of vector representations with the distribution associated with the second set of vector representations 505

↓

Detect, based on a comparison of the distribution associated with the first set of vector representations with the distribution associated with the second set of vector representations, data drift between the first set of vector representations and the second set of vector representations 506

↓

Cause transmission of a signal to cause a remedial action in response to the data drift exceeding a data drift threshold 507

FIG. 5

Identify a set of clusters from a first set of vector representations 601

Determine a center associated with each cluster from the set of clusters to generate a set of centers 602

Determine, for each vector representation from the first set of vector representations and to generate a first set of distributions, a distribution of that vector representation that (1) is included in the first set of distributions and (2) indicates, for each center from the set of centers, similarity between that vector representation and that center 603

Determine, for each vector representation from a second set of vector representations and to generate a second set of distributions, a distribution of that vector representation that (1) is included in the second set of distributions and (2) indicates, for each center from the set of centers, similarity between that vector representation and that center 604

Compute a set of divergence metrics associated with the first set of vector representations and the second set of vector representations based on comparing the first set of distributions and the second set of distributions 605

FIG. 6

SYSTEM AND METHOD FOR DATA DRIFT DETECTION TO IMPROVE DATA INTEGRITY FOR DATA WITHIN A DATABASE

FIELD

One or more embodiments are related to a system and method for data drift detection to improve data integrity for data within a database.

BACKGROUND

Data distributions of models (e.g., machine learning models) may change over time, such as between training and deployment. Such changes can negatively affect performance and reliability of the models (and systems incorporating the models). For example, changes in data distributions (also referred to herein as "data drift") can cause accuracy of a given model to decrease. Considering such issues, monitoring for "data drift" can be desirable to ensure that ML models work as desired.

SUMMARY

In an embodiment, a method comprises receiving a first set of data having dimensionality greater than a predetermined value. The method further comprises generating a first set of vector representations from the first set of data using a vectorization model. The first set of vector representations have dimensionality not greater than the predetermined value. The method further comprises generating a set of clusters from the first set of vector representations. The method further comprises determining a statistical property associated with each cluster from the set of clusters to generate a set of statistical properties. The method further comprises associating, using the set of statistical properties and to generate a distribution associated with the first set of vector representations, each vector representation from the first set of vector representations to a cluster from the set of clusters. The method further comprises receiving a second set of data having dimensionality greater than the predetermined value, the second set of data different than the first set of data. The method further comprises generating a second set of vector representations from the second set of data using the vectorization model. The second set of vector representations do not have dimensionality greater than the predetermined value. The method further comprises associating, using the set of statistical properties and to generate a distribution associated with the second set of vector representations, each vector representation from the second set of vector representations to a cluster from the set of clusters. The method further comprises detecting, based on a comparison of the distribution associated with the first set of vector representations with the distribution associated with the second set of vector representations, data drift between the first set of vector representations and the second set of vector representations. The method further comprises causing transmission of a signal to cause a remedial action in response to the data drift exceeding a data drift threshold.

In an embodiment, an apparatus comprises a memory and a processor operatively coupled to the memory. The processor is configured to generate a set of clusters from a first set of vector representations, the first set of vector representations generated from a first set of data using a vectorization model. The processor is further configured to determine a statistical property associated with each cluster from the set of clusters to generate a set of statistical properties. The processor is configured to associate, using the set of statistical properties and to generate a distribution associated with the first set of vector representations, each vector representation from the first set of vector representations to a cluster from the set of clusters. The processor is configured to associate, using the set of statistical properties and to generate a distribution associated with a second set of vector representations, each vector representation from the second set of vector representations to a cluster from the set of clusters. The second set of vector representations are different than the first set of vector representations. The second set of vector representations are generated from a second set of data different than the first set of data using the vectorization model. The processor is configured to compare the distribution associated with the first set of vector representations with the distribution associated with the second set of vector representations. The processor is configured to detect, based on a comparison of the distribution associated with the first set of vector representations with the distribution associated with the second set of vector representations, data drift between the first set of vector representations and the second set of vector representations. The processor is configured to cause transmission of a signal to cause a remedial action in response to the data drift exceeding a data drift threshold.

In an embodiment, a machine-readable medium stores code representing instructions to be executed by a processor, the code comprising code to cause the processor to identify a set of clusters from a first set of vector representations. The code further comprises code to cause the processor to determine a center associated with each cluster from the set of clusters to generate a set of centers. The code further comprises code to cause the processor to determine, for each vector representation from the first set of vector representations and to generate a first set of distributions, a distribution of that vector representation that (1) is included in the first set of distributions and (2) indicates, for each center from the set of centers, similarity between that vector representation and that center. The code further comprises code to cause the processor to determine, for each vector representation from a second set of vector representations and to generate a second set of distributions, a distribution of that vector representation that (1) is included in the second set of vector representations and (2) indicates, for each center from the set of centers, similarity between that vector representation and that center. The code further comprises code to cause the processor to compute a set of divergence metrics associated with the first set of vector representations and the second set of vector representations based on comparing the first set of distributions and the second set of distributions.

BRIEF DESCRIPTION OF THE DRAWINGS

FIGS. 4A-4B show a flowchart of a method for causing a remedial action in response to detecting data drift exceeding a data drift threshold, according to an embodiment.

FIG. 5 show a flowchart of a method for causing a remedial action in response to detecting data drift exceeding a data drift threshold, according to an embodiment.

FIG. 6 show a flowchart of a method for determining a set of divergence metrics associated with sets of vector representations, according to an embodiment.

DETAILED DESCRIPTION

Figure 1:
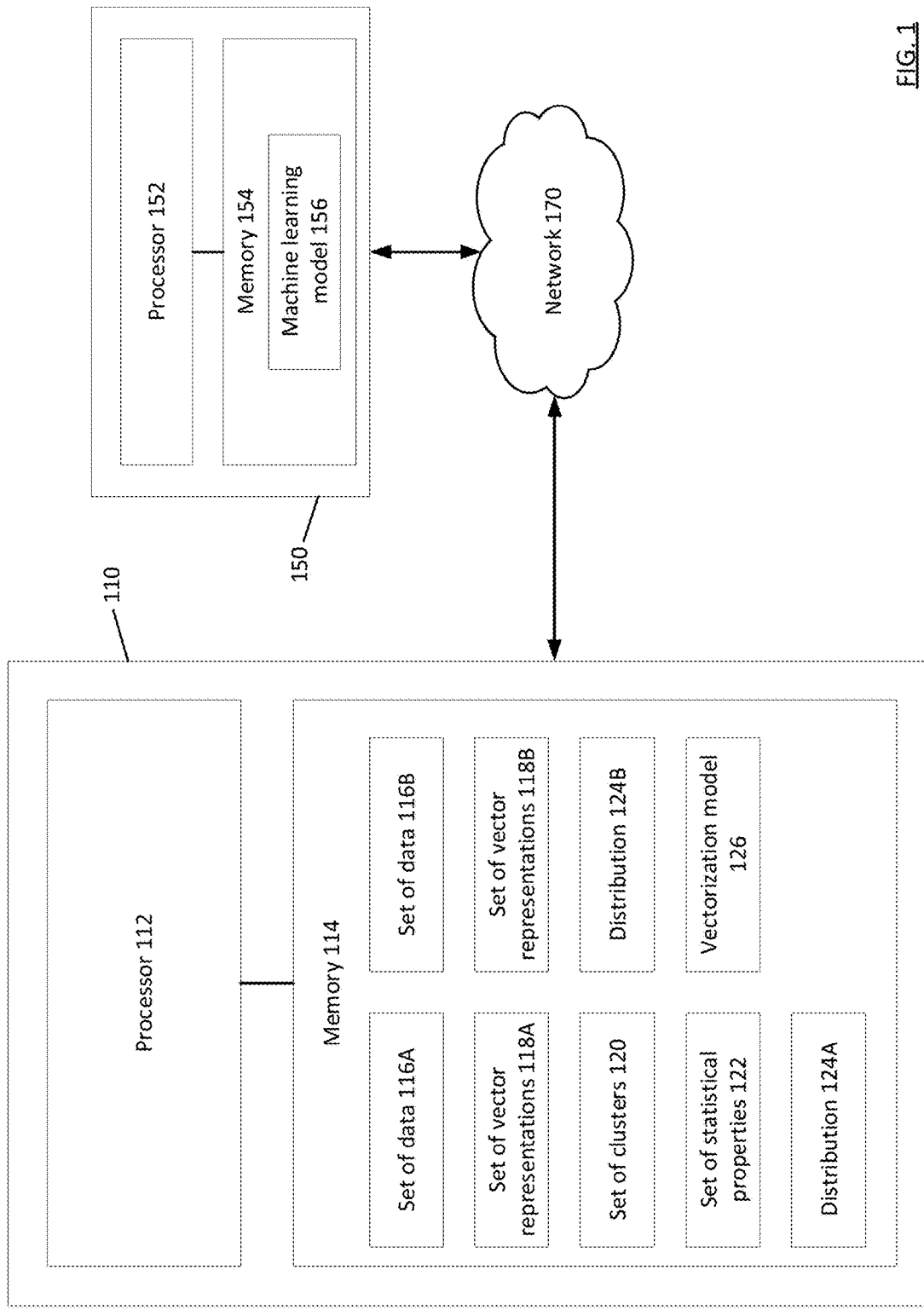
FIG. 1 shows a block diagram of a system that can detect data drift between multiple sets of data, according to an embodiment.

Data distributions associated with a model(s), such as a machine learning model, may shift over time (e.g., production versus deployment). Because data drift can negatively affect performance and reliability of a given model(s), such instances of data drift can be desirable to detect. As such, some techniques described herein enable data drift to be detected. For example, a distribution for a first set of data can be determined, where attributes associated with the distribution for the first set of data can serve to indicate baseline information. Thereafter, a distribution for a second set of data can be determined based on the attributes associated with the distribution for the first set of data. The distribution for the first set of data can be compared with the distribution for the second set of data to determine if and/or how much data drift has occurred.

Some techniques described herein can improve the performance of models, such as machine learning models. Data drift not being identified and/or being identified too late can have a myriad of consequences, such as a model making an incorrect assumption or computer or organization wasting resources. By being able to detect data drift using some techniques described herein, such effects can be better avoided.

Some techniques described herein can be applied across a wide variety of data types, including unstructured data and/or high-dimensional data. Being applicable across a wide variety of data types also enables some techniques described herein to be applied across a wide variety of use cases. As such, some techniques described herein can be applied in use cases that may not be otherwise possible if relying on known techniques.

In some implementations, high dimensional data refers to any data that is not and/or cannot be stored as 1-dimensional number columns in a table. In some implementations, high dimensional data refers to any multi-dimensional data input or any unstructured data that needs to be and/or can be transformed to multidimensional vectors, In some implementations, high dimensional data refers to a dataset in which the number of features is larger than the number of observations. In some implementations, high dimensional data refers to a dataset in which the number of features is significantly larger than (e.g., by 10%, by 25%, by 33%, by 50%, by 67%, by 75%, by 100%, and/or the like) the number of observations. In some implementations, low dimensional data refers to a dataset in which the number of features is less than the number of observations. In some implementations, low dimensional data refers to a dataset in which the number of features is significantly less than (e.g., by 10%, by 25%, by 33%, by 50%, by 67%, by 75%, by 100%, and/or the like) the number of observations. In some implementations, unstructured data refers to data that does not have a predefined data format and/or is not organized in a predefined manner. In some implementations, structured data refers to data that does have a predefined data format and/or is organized in a predefined manner.

Some techniques described herein generate and use vector representations of higher dimension data and/or unstructured data, such as certain forms of images, images with captions, free form text, multi-modal data, video, audio, social media posts, and/or the like. In some instances, generating vector representations from higher dimension data and/or unstructured data can enable data drift to be detected with respect to that higher dimension data and/or unstructured data, something that may not have been possible if vector representations were not generated. Additionally, in some instances, using vector representations of higher dimension data and/or unstructured data can reduce complexity, storage requirements, and/or computing power used (e.g., by data drift detection compute device 110, described below) to detect data drift with respect to the higher dimension data and/or unstructured data.

FIG. 1 shows a block diagram of a system that can detect data drift between multiple sets of data (e.g., baseline data and production data), according to an embodiment. FIG. 1 includes a data drift detection compute device 110 and user compute device 150. Data drift detection compute device 110 and user compute device 150 can be communicably coupled to one another via a network 170. In some implementations, data drift detection compute device 110 is remote from user compute device 150.

The network 170 can be any suitable communications network for transferring data, operating over public and/or private networks. For example, the network 170 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 170 can be a wireless network such as, for example, a Wi-Fi or wireless local area network ("WLAN"), a wireless wide area network ("WWAN"), and/or a cellular network. In other instances, the network 170 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 170 can be encrypted or unencrypted. In some instances, the communication network 170 can include multiple networks or subnetworks operatively coupled to one another by, for example, network bridges, routers, switches, gateways and/or the like (not shown).

The user compute device 150 includes a processor 152 operatively coupled to a memory 154 (e.g., via a system bus). The user compute device 150 can be any type of device, such as a server, desktop, laptop, mobile device, internet of things device, and/or the like. In some implementations, the user compute device 150 can be used (at least partially) in the field (e.g., engaged in practical work in a natural environment; away from a laboratory or studio) to perform functions related to, for example, natural language processing or computer vision.

The processor 152 of the user compute device 150 can be, for example, a hardware based integrated circuit (IC) or any other suitable processing device configured to run and/or execute a set of instructions or code. For example, the processor 152 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 152 can be configured to run any of the methods and/or portions of methods discussed herein.

The memory 154 of the user compute device 150 can be, for example, a random-access memory (RAM), a memory buffer, a hard drive, a read-only memory (ROM), an erasable programmable read-only memory (EPROM), and/or the like. In some instances, the memory 154 can store, for example, one or more software programs and/or code that can include instructions to cause the processor 152 to perform one or more processes, functions, and/or the like. In some implementations, the memory 154 can include extendable storage units that can be added and used incrementally. In some implementations, the memory 154 can be a portable memory (e.g., a flash drive, a portable hard disk, and/or the like) that can be operatively coupled to the processor 152. In some instances, the memory 154 can be remotely operatively coupled with a compute device (not shown); for example, a remote database device can serve as a memory and be operatively coupled to the user compute device 150.

The memory 154 can store a representation of a machine learning model 156. The machine learning model 156 can be any type of machine learning model that uses data (e.g., takes as input, produces output based on, produces as output, and/or the like). For example, the machine learning model 156 may be used to perform functions related to natural language processing (e.g., analyzing speech, analyzing entities, analyzing sentiment, etc.) or computer vision (e.g., analyzing images, analyzing video, etc.). The machine learning model 156 may be designed and/or trained at any compute device, such as data drift detection compute device 110, user compute device 150, and/or a compute device not shown in FIG. 1. In some implementations, the machine learning model 156 was not designed and/or trained at user compute device 150.

The machine learning model 156 may have been trained during a training phase, and be used thereafter during a deployment/production phase. In some implementation, the machine learning model 156 can use only high-dimensional data, only low dimensional data, only unstructured data, only structured data, or a combination thereof.

The user compute device 150 may rely on the machine learning model 156 during operation. For example, the user compute device 150 may rely on output from the machine learning model 156 to determine a mode of operation (e.g., high performance mode, low performance mode, battery saver mode, increased brightness, decreased brightness, running or opening a certain set of applications, closing a certain set of application, etc.). Data drift can cause inaccurate and/or incomplete output to be produced by the machine learning model 156, which in turn can cause the user compute device 150 to change to a mode of operation that the user compute device 150 should not have changed to and/or remain in a mode of operation that the user compute device 150 should not have remained in. On the other hand, early detection of data drift can cause the negative effects of data drift to be mitigated, such as changing to a mode of operation at user compute device 150 that mitigates negative impact of data drift.

The draft drift detection compute device 110 includes a processor 112 operatively coupled to a memory 114 (e.g., via a system bus). The data drift detection compute device 110 can be any type of device, such as a server, desktop, laptop, mobile device, internet of things device, and/or the like.

The processor 112 can be, for example, a hardware-based integrated circuit (IC) or any other suitable processing device configured to run and/or execute a set of instructions or code. For example, the processor 112 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 112 can be configured to run any of the methods and/or portions of methods discussed herein.

The memory 114 can be, for example, a random-access memory (RAM), a memory buffer, a hard drive, a read-only memory (ROM), an erasable programmable read-only memory (EPROM), and/or the like. In some instances, the memory 114 can store, for example, one or more software programs and/or code that can include instructions to cause the processor 112 to perform one or more processes, functions, and/or the like. In some implementations, the memory 114 can include extendable storage units that can be added and used incrementally. In some implementations, the memory 114 can be a portable memory (e.g., a flash drive, a portable hard disk, and/or the like) that can be operatively coupled to the processor 112. In some instances, the memory 114 can be remotely operatively coupled with a compute device (not shown); for example, a remote database device can serve as a memory and be operatively coupled to the data drift detection compute device 110.

The memory 114 can include (e.g., store) representations of set of data 116A, set of data 116B, set of vector representations 118A, set of vector representations 118B, set of clusters 120, set of statistical properties 122, distribution 124A, distribution 124B, and a vectorization model 126. The set of data 116A can represent a set of data (e.g., objects) that was used at/by machine learning model 156. For example, the set of data 116A may have been used to train and/or test the machine learning model 156 prior to production/deployment. The machine learning model 156 can be trained and/or tested at data drift detection device 110, user compute device 150, and/or a different compute device not shown in FIG. 1. In some implementations, the set of data 116A includes high-dimensional data.

A set of vector representations 118A can be determined based on the set of data 116A using a vectorization model 126. The set of vector representations 118A can include lower-dimensional vector representations of the set of data 116A. The vector representations 118A could include, for example, vector embeddings or intermediate representations. The vectorization model 126 can be, for example, a neural network and/or deep neural network configured to determine vector representations from sets of data. Additional details related to the vectorization model 126 are discussed below.

Representation of a set of clusters 120 can be determined based on the set of vector representations 118A. The set of clusters 120 can be determined using supervised learning or unsupervised learning (e.g., by a machine learning model included in memory 114 but not shown in FIG. 1). In some implementations, k-means clustering, density-based spatial cluster of applications with noise (DBSCAN), Hierarchical-DBSCAN, and/or the like can be used to determine the set of clusters 120. A set of statistical properties 122 associated with the set of clusters 120 can also be determined (e.g., by a software model included in memory 114 but not shown in FIG. 1). For example, the set of statistical properties 122 can include indications of cluster centers for each cluster form the set of clusters 120. In some implementations, the center of a cluster can refer to a substantial/approximate center of the cluster, such as within 1% of the center, 2% of the center, 3% of the center, 5% of the center, 10% of the center, within 25% of the center, and/or the like. Any other statistical property can be used additionally or alternatively, such as mean or range.

A distribution 124A associated with the set of data 116A and set of vector representations 118A can be determined based on the set of statistical properties 122. In some implementations, each vector representation from the set of vector representations 118A is associated with (e.g., is linked to, is binned to) a cluster from the set of clusters 120 that is most similar to (e.g., closest distance in vector space) that vector representation. In some instances, multiple different vector representations from the set of vector representations 118A can be associated with a common cluster from the set of clusters 120. In some implementations, the distribution 124A can indicate, for each vector representation from the set of vector representations 118A, a cluster from the set of clusters 120 whose associated statistical property from the set of statistical properties 122 to which that vector representation is most similar. As such, the distribution 124A can also indicate the number of vector representations from the set of vector representations 118A associated with a given cluster from the set of clusters 120.

The set of data 116B can represent a set of data (e.g., objects) that was used at/by machine learning model 156. For example, the set of data 116B may have been used by the machine learning model 156 to generate an output after deployment of the machine learning model 156 into the field.

In some implementations, the set of data 116B is different than the set of data 116A. In some implementations, the set of data 116A was generated at a first compute device (e.g., for production), and the set of data 116B was generated at a second compute device different than the first compute device (e.g., for usage after production). Set of data 116A can be associated with (e.g., generated at, received at, sent at) a first time, and set of data 116B can be associated with (e.g., generated at, received at, sent at) a second time different than the first time; for example, the second time may be after the first time.

A set of vector representations 118B can be determined based on the set of data 116B using the vectorization model 126. The set of vector representations 118B can include lower-dimensional vector representations of the set of data 116B. The vector representations 118B could include, for example, vector embeddings or intermediate representations. In some implementations, vector representations from the set of vector representations 118B are generated as associated data events from the set of data 116B are received (e.g., automatically, substantially in real time and without requiring additional human input).

A distribution 124B associated with the set of data 116B and set of vector representations 118B can be determined based on the set of statistical properties 122. In some implementations, each vector representation from the set of vector representations 118B becomes associated with (e.g., is linked to) a cluster from the set of clusters 120 that is most similar to that vector representation using the set of statistical properties 122. In such a case, the distribution 124B can indicate, for each vector representation from the set of vector representations 118B, a cluster from the set of clusters 120 whose associated statistical property from the set of statistical properties 122 to which that vector representation is most similar. As such, the distribution 124B can also indicate the number of vector representations from the set of vector representations 118B associated with a given cluster from the set of clusters 120. Note that both distributions 124A and 124B were determined based on the same set of statistical properties (i.e., set of statistical properties 122). Additionally, note that one or more clusters from the set of clusters can each be associated with multiple different vector representations from the set of vector representations 118B.

Distribution 124A and 124B can be compared to detect if data drift has occurred and/or how much data drift has occurred. If, for example, distribution 124A is substantially different from distribution 124B (e.g., by more than 1%, by more than 2%, by more than 5%, by more than 10%, by more than 25%, by more than 50%, etc.), data drift can be considered to have occurred. The amount of difference between distributions 124A and 124B can also be considered to determine how much data drift has occurred. In some implementations, data drift is detected (if present) using for example Jensen-Shannon divergence, Earth Mover's Distance, Wasserstein metric, and/or Kullback-Leibler divergence.

If data drift is considered to have occurred and/or an amount of the draft drift exceeds a predetermined data drift threshold, a remedial action can occur and/or can be initiated (triggered). For example, the data drift detection compute device 110 can send a signal to user compute device 150 and/or a compute device not shown in FIG. 1, alerting the presence of data drift and/or data drift beyond the predetermined data drift threshold. As another example, the data drift detection compute device 110 can send a signal to user compute device 150 to cause operation of the machine learning model 156 to stop; this can prevent, for example, the user compute device 150 from relying on faulty data that otherwise may have been produced by the machine learning model 156. As another example, the data drift detection compute device 110 can send a signal to user compute device 150 to cause a mode of operation of the machine learning model 156 to adjust, such as disabling certain features of the machine learning model 156, enabling certain features of the machine learning model 156, updating certain features of the machine learning model 156, and/or the like. As another example, a compute device (e.g., the data drift detection compute device 110) can perform further analysis to determine a potential cause(s) of the data drift; in turn, the compute device may perform appropriate actions to address the potential cause(s), such as modifying a training procedure of the machine learning model 156, modifying a set of training data prior to training the machine learning model 156, initiating a new training of the machine learning model 156 based on new data, and/or the like.

In some implementations, the distribution 124A is a histogram, where each cluster from the set of clusters 120 is associated with a unique bin of the histogram; said similarly, each cluster from the set of clusters 120 is associated with a bin of the histogram different than remaining bins from of the histogram. The set of statistical properties 122 can serve as proxies for the bins of the histogram. For example, if the set of statistical properties 122 includes five center values of five different clusters, the histogram can include five different bins (each bin associated with a center value/cluster). Thus, the number of bins in the histogram can be the same as the number of clusters in the set of clusters 120.

In some implementations, the vectorization model 126 is trained to extract vector representations of data, such as objects. For example, the vectorization model 126 may be a neural network or deep neural network (e.g., located in memory 114), where input data can be used as input training data and vector representations of the input data can be used as target training data. In some implementations, the vectorization model 126 is trained using self-supervised and/or task-specific loss. For example, training can include usage of a loss function that may be a linear combination of self-supervised loss and loss from a downstream task for which the machine learning model 156 is intended. Alternatively, in the absence of a downstream task for which the machine learning model 156 is intended, self-supervised loss can be used (and not task-specific loss). Alternatively, the vectorization model 126 can be trained on task-specific loss (and not self-supervised loss). Examples of self-supervised loss can include, for example, contrastive self-supervised learning (e.g., encode what makes two things similar or different) and/or Bidirectional Encoder Representations from Transformers (BERT). In some implementations, the vectorization model 126 can use for example Word2vec, term frequency-inverse document frequency (TF-IDF), Vector Propagation for Click Graphs (VPCG), Uniform Manifold Approximation and Projection (UMAP), and/or the like.

In some implementations, if dimensionality of the set of vector representations 118A and/or 118B is too high, dimensionality of the set of vector representations 118A and/or 118B can be further reduced until the dimensionality is less than a predetermined threshold (e.g., less than or equal to 5 dimensions, less than or equal to 10 dimensions, less than or equal to 15 dimensions, less than or equal to 20 dimensions, less than or equal to 25 dimensions, etc.). For example, UMAP can be used to perform further dimensionality reduction.

In some implementations, the set of data 116A can come from a first compute device, and the set of data 116B can come from a second compute different than the first compute device. In some implementations, sets of data 116A and 116B can both come the same compute device.

Although FIG. 1 only shows two sets of data (116A and 116B) and two sets of vector representations (118A and 118B), in some implementations, the data drift detection compute device 110 can determine additional sets of vector representations for additional sets of data. In some implementations, distributions for those additional sets of vector representations can be determined based on the set of clusters 120 and set of statistical properties 122. In some implementations, distributions for those additional sets of vector representations can be determined based on a different set of clusters and statistical properties, such as a set of clusters and associated statistical properties determined based on the set of vector representations 118B and/or a set of vector representations not shown in FIG. 1. As such, the set of clusters and set of statistical properties used for generating the distribution that is to act as the baseline and be compared against another distribution(s) (e.g., from production) for detecting data drift can change over time.

In some implementations, the machine learning model 156 is associated with a natural language processing task, and the sets of vector representations 118A and 118B are embedding vectors. Using embedding vectors allows semantic similarity of associated natural langue processing data to be quantified (e.g., by how close the vectors are in vector space). Therefore, as an example, two sentences sharing little to no common words but still having semantic similarity can be identified as similar (e.g., because associated embedding vectors may be located in close proximity and associated with the same cluster). Therefore, data drift (or lack thereof) can be identified for changes in semantic meaning.

In some implementations, instead of or in addition to associating each vector representation from the sets of vector representations 118A and 118B to a single cluster from the set of clusters 120, a probability distribution can be determined for each vector representation from the sets of vector representations 118A and 118B, indicating similarity (e.g., proximity) to each cluster from the set of clusters 120. For example, a vector representation 118A may be determined to be 80% similar to a first cluster from the set of clusters 120, 15% similar to a second cluster from the set of clusters 120, and 5% similar to a third cluster from the set of clusters 120. Probability distributions can be generated and compared to determine if and/or how much data drift has occurred.

In some implementations, the drift detection compute device 110 can receive an indication that indicates the number of clusters to be included in the set of clusters 120. The indication can come from a user using, for example, drift detection compute device 110, user compute device 150, and/or a compute device not shown in FIG. 1.

In some implementations, the data drift detection compute device 110 can receive an indication that indicates a minimum number of vector representations used to form a cluster, where the number of clusters included in the set of clusters 120 is based on the minimum number of vector representations. The indication can come from a user using, for example, drift detection compute device 110, user compute device 150, and/or a compute device not shown in FIG. 1.

In some implementations, the number of clusters to be included in the set of clusters 120 can be a function of a size (e.g., count) of the set of vector representations 118A and/or set of data 116A. For example, as the number of vector representations included in the set of vector representations 118A increases, the number of clusters included in the set of clusters 120 can also increase. As another example, as the number of vector representations included in the set of vector representations 118A decreases, the number of clusters included in the set of clusters 120 can also decrease.

In some implementations, the data drift detection compute device 110 can perform outlier detection for data/vector representations. For example, each vector representation from the set of vector representations 118A (and/or set of vector representations 118B) can be compared to the set of clusters 120/set of statistical properties 122 to determine if that vector representation is an outlier. In some implementations, a vector representation determined to be an outlier can be ignored when generating distributions 124A (and/or distributions 124B). In some implementations, a vector representation is an outlier if a distance between the vector representation and the cluster nearest/most similar to the vector representation in the vector space is greater than a predetermined threshold. In some implementations, a vector representation is an outlier if a distance between the vector representation and the cluster nearest/most similar to the vector representation in the vector space is less than a predetermined threshold. In some implementations, considering all distances between vector representations and their associated closest cluster (such that a first quartile value and third quartile value exist), a vector representation is an outlier if the distance of that vector representation is more than (third quartile value)+((1.5)*(interquartile range)) or less than (first quartile value)−((1.5)*(interquartile range)). Note that third quartile value−first quartile value=interquartile range.

In some implementations, the data drift detection compute device 110 can determine when the set of statistical properties 122 is to be replaced and/or updated (e.g., determine cluster centers for a different set of clusters). For example, if (1) comparisons of distributions against the set of statistical properties 122/distribution 124A repeatedly determine that data drift has occurred a predetermined minimum number of times, (2) comparisons of distributions against the set of statistical properties 122/distribution 124A repeatedly determine that data drift beyond a predetermined data drift threshold has occurred a predetermined minimum number of times, (3) a predetermined period of time has elapsed since the set of statistical properties 122 were generated (e.g., one minute, one hour, one day, one week, one month, one year, etc.), and/or the like, the set of statistical properties 122 can be updated. This can look like, for example, determining a new set of statistical properties for a different set of vector representations, and using the new set of statistical properties when generating distributions.

Figure 2A:
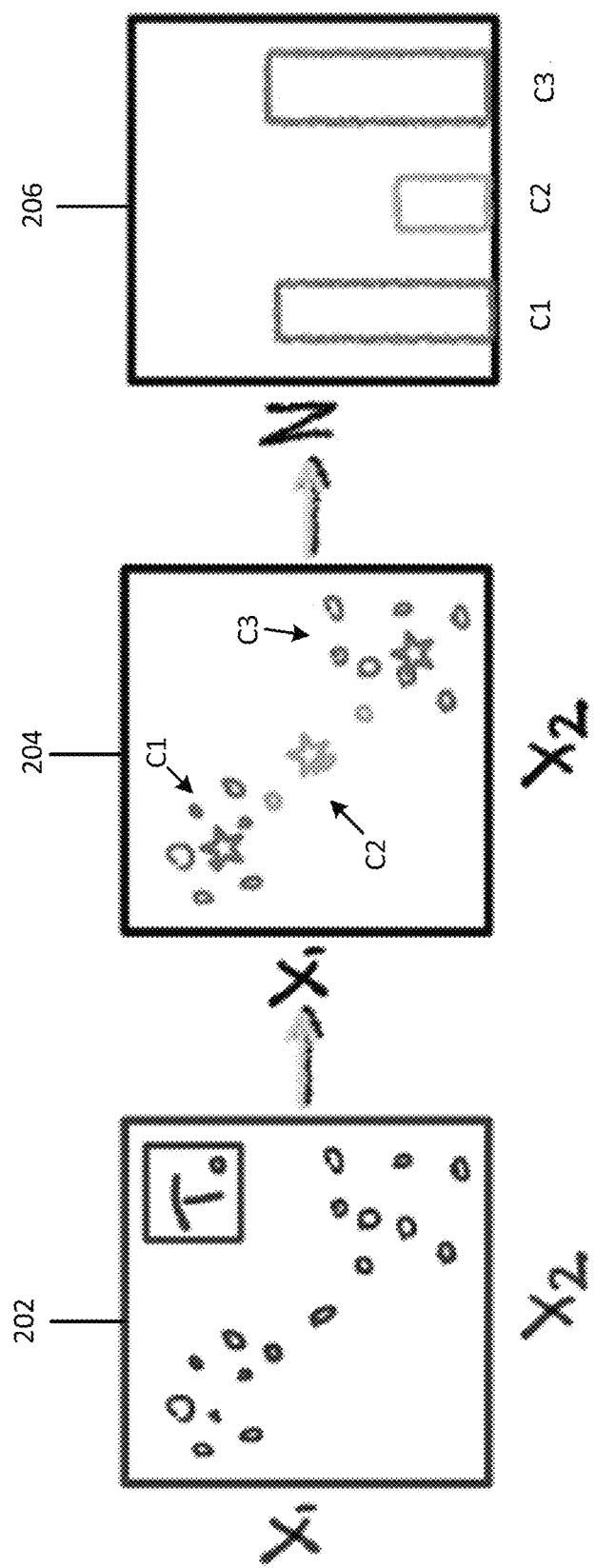
FIGS. 2A-2C illustrate a process for detecting data drift, according to an embodiment.
Figure 2B:
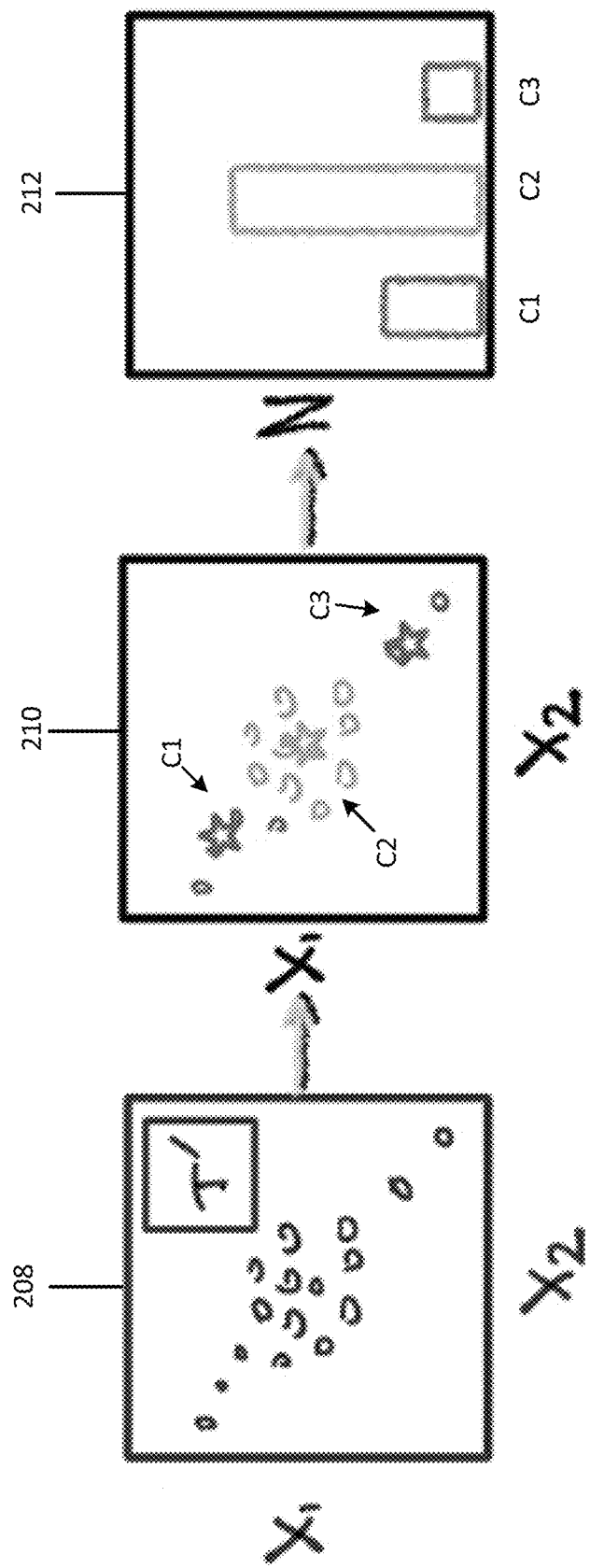
Figure 2C:
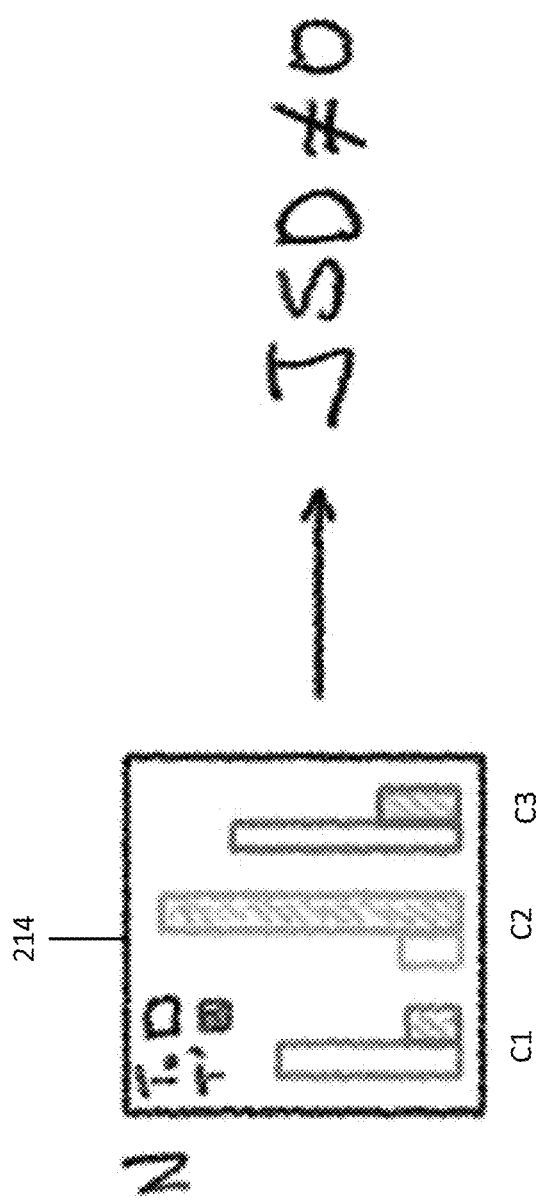

FIGS. 2A-2C illustrate a process for detecting data drift, according to an embodiment. FIG. 2A includes chart 202. Chart 202 shows a first set of vector representations associated with time $T_0$. Chart 202 can represent a vector space that includes coordinates for $x_1$ and $x_2$. Although vectors typically each are associated with a direction and magnitude, note that dot/point/circles are used to represent vector representations in FIGS. 2A and 2B for simplicity.

Clusters can be identified from the first set of vector representations, as shown by clusters C1, C2, and C3 at chart 204. A center (or substantially center) for each cluster C1, C2, and C3 is also identified (represented by the stars in chart 204). In some implementations, each vector representation from the first set of vector representations is associated to a cluster C1, C2, or C3 by determining the cluster whose center is closest to that vector representation in the vector space.

A first histogram is shown at chart 206, where N can represent, for example, a range of count values, a range of normalized count values, a range of probability values, and/or the like. In some implementations, column C1 of chart 206 can represent the number or proportion of vector representations from the first set of vector representations associated to cluster C1, column C2 of chart 206 can represent the number or proportion of vector representations from the first set of vector representations associated to cluster C2, and column C3 of chart 206 can represent the number or proportion of vector representations from the first set of vector representations associated to cluster C3.

FIG. 2B includes chart 208. Chart 208 shows a second set of vector representations associated with time T'. Like chart 202, chart 208 can represent a vector space that includes coordinates for $x_1$ and $x_2$. Note, however, that the distribution of vector representations differs between chart 202 and 208.

Using the cluster centers for clusters C1, C2, and C3 determined with respect to chart 204, each vector representation from the second set of vector representations is associated to a cluster C1, C2, or C3 by determining the cluster whose center is closest to that vector representation in the vector space. Such associating is visualized at chart 210.

A second histogram is shown at chart 212. In some implementations, column C1 of chart 212 can represent the number or proportion of vector representations from the second set of vector representations associated to cluster C1, column C2 of chart 212 can represent the number or proportion of vector representations from the second set of vector representations associated to cluster C2, and column C3 of chart 212 can represent the number or proportion of vector representations from the second set of vector representations associated to cluster C3.

As shown at chart 214 of FIG. 2C, the first histogram (i.e., chart 206) can be compared to the second histogram (i.e., chart 212). For example, a Jensen-Shannon divergence (JSD) value can be computed using the first histogram and the second histogram to determine that the JSD value is non-zero. The JSD value could indicate if and/or how much data drift exists between the first set of vector representations (and associated data represented by the first set of vector representations) and the second set of vector representations (and associated data represented by the second set of vector representations).

Figure 3A:
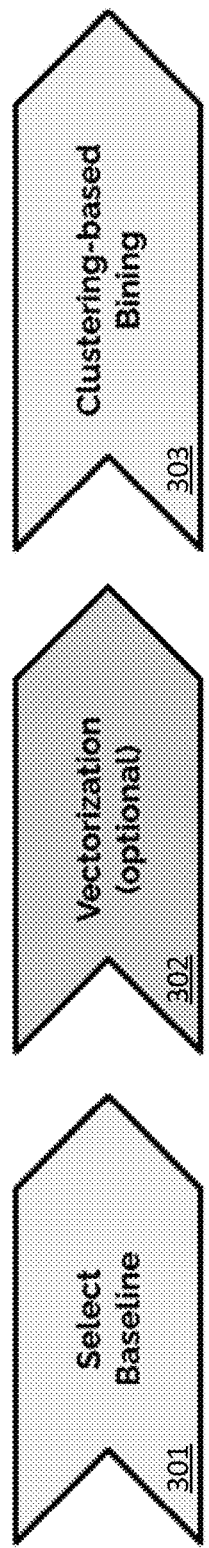
FIGS. 3A-3B shows a flow diagram for model registration and event ingestion after model registration, according to an embodiment.

FIG. 3A shows a flow diagram for model registration, according to an embodiment. At 301, baseline data is selected. The baseline data can include for example vector representations, such as embedding vectors. The term baseline is used because statistical properties of clusters generated from the baseline data will be used as reference points for comparing against future data to determine if/how much data drift has occurred. An example of baseline data is the set of vector representations 118A.

Optionally, if dimensionality of the baseline data selected at 301 is beyond an acceptable threshold dimensionality, additional vectorization can occur at 302 such that a dimensionality of the baseline data is reduced to less than the acceptable threshold dimensionality. In some implementations, if dimensionality of the baseline data selected at 301 is not beyond an acceptable threshold dimensionality, 302 is not performed.

At 303, clustering-based binning can occur to generate a representation of a first histogram. For example, clusters can be identified from the baseline data from 301 (or baseline data with reduce dimensionality from 302), and each vector representation from the baseline data (or baseline data with reduce dimensionality) is associated with (e.g., binned to) a cluster. In some instances, if clusters are identified based on global distance metrics (e.g., k-means), UMAP is not used for vectorization at 302.

Figure 3B:
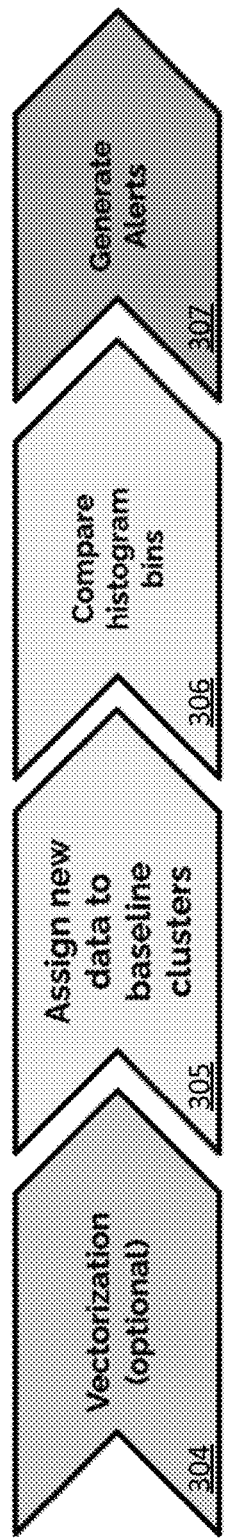

FIG. 3B shows a flow diagram for event ingestion by a model after registration, according to an embodiment. After the model has been registered via steps 301-303, the model can receive and/or output additional data; such additional data may be represented by vector representations. Optionally, at 304, a dimensionality of the vector representations can be further reduced. For example, if dimensionality of the vector representations is beyond an acceptable threshold dimensionality, additional vectorization can occur at 304 such that the dimensionality is reduced to less than the acceptable threshold dimensionality.

At 305, the vector representations (or dimensionality reduced vector representations) can each be assigned to a cluster identified during step 303, and an associated second histogram can be generated. The first histogram and second histogram can be compared at 306 using divergence metrics. If data drift is detected and/or the data drift exceeds a predetermined threshold amount of data drift, an alert can be generated at 307.

FIGS. 4A-4B show a flowchart of a method 400 for causing a remedial action in response to detecting a data drift exceeding a data drift threshold, according to an embodiment. In some implementations, method 400 can be performed by a processor (e.g., processor 112).

At 401, a first set of data (e.g., set of data 116A) having dimensionality greater than a predetermined value (e.g., greater than 128 dimensions, greater than 10 dimensions) is received. In some implementations, the first set of data can include only high dimensional data, only low dimensional data, only structured data, only unstructured data, or a combination thereof. In some implementations, the first set of data is received from a remote compute device (e.g., at substantially real time).

At 402, a first set of vector representations (e.g., set of vector representations 118A) is generated from the first set of data using a vectorization model (e.g., vectorization model 126). The first set of vector representations have dimensionality not greater than the predetermined value. In some implementations, the vectorization model is a neural network and/or deep neural network trained using at least one of a self-supervised loss technique or a loss from a downstream task associated with the deep learning neural network. In some implementations, step 402 is performed automatically (e.g., without requiring additional human input) in response to completing step 401.

At 403, a set of clusters (e.g., set of clusters 120) are generated from the first set of vector representations. The set of clusters can include any number of clusters such as one or more than one. Each cluster from the set of clusters can be associated with at least one vector from the first set of vector representations. In some implementations, each cluster from the set of clusters can be associated with at least two vectors from the first set of vector representations. In some implementations, step 403 is performed automatically (e.g., without requiring additional human input) in response to completing step 402.

At 404, a statistical property associated with each cluster from the set of clusters is determined to generate a set of statistical properties (e.g., set of statistical properties 122). Examples of statistical properties can include the center, mean, range, and/or the like. In some implementations, step 404 is performed automatically (e.g., without requiring additional human input) in response to completing step 403.

At 405, each vector representation from the first set of vector representations is associated to a cluster from the set of clusters using the set of statistical properties to generate a distribution (e.g., distribution 124A) associated with the first set of vector representations. In some implementations, the set of statistical properties indicate centers of clusters from the set of clusters, and each vector representation from the first set of vector representations is associated to the cluster whose center is most similar to (e.g., closest in the vector space) that vector representation; such information is represented by the distribution associated with the first set of vector representations. In some implementations, step 405 is performed automatically (e.g., without requiring additional human input) in response to completing step 404.

At 406, a second set of data (e.g., set of data 116B) having dimensionality greater than the predetermined value is received. The second set of data is different than the first set of data. In some implementations, the second set of data can include only high dimensional data, only low dimensional data, only structured data, only unstructured data, or a combination thereof. In some implementations, the second set of data is received from a remote compute device (e.g., at substantially real time). In some implementations, 406 occurs a predetermined amount of time after 405 (e.g., one hour, 12 hours, one day, one week, one month, three months, six months, one year, etc.). In some implementations, 406 occurs automatically (e.g., in substantially real time and without requiring human intervention) after the second set of data has been generated.

At 407, a second set of vector representations (e.g., set of vector representations 118B) from the second set of data is generated using the vectorization model. The second set of vector representations does not have dimensionality greater than the predetermined value. In some implementations, step 407 is performed automatically (e.g., without requiring additional human input) in response to completing step 406.

At 408, each vector representation from the second set of vector representations is associated to a cluster from the set of clusters using the set of statistical properties to generate a distribution (e.g., distribution 124B) associated with the second set of vector representations. In some implementations, the set of statistical properties indicate centers of clusters from the set of clusters, and each vector representation from the second set of vector representation is associated to the cluster whose center is most similar to (e.g., closest in the vector space) that vector representation; such information is represented by the distribution associated with the second set of vector representations. In some implementations, step 408 is performed automatically (e.g., without requiring additional human input) in response to completing step 407.

At 409, data drift is detected between the first set of vector representations and the second set of vector representations based on a comparison of the distribution associated with the first set of vector representations with the distribution associated with the second set of vector representations. In some implementations, the data drift is detected using at least one of Jensen-Shannon divergence, Earth Mover's Distance, Wasserstein metric, or Kullback-Leibler divergence. In some implementations, step 409 is performed automatically (e.g., without requiring additional human input) in response to completing step 408.

At 410, transmission of a signal is caused, in response to the data drift exceeding a data drift threshold, to cause a remedial action. With reference to FIG. 1, the signal could be transmitted to the data drift detection device 110, user compute device 150, and/or a compute device not shown in FIG. 1. For example, the remedial action could include causing an alert indicating that the data drift exceeds the data drift threshold to be triggered. As another example, the remedial action could include causing a compute device (e.g., data drift detection compute device 110 and/or user compute device 150) and/or machine learning model (e.g., machine learning model 156) to change and/or modify a mode of operation, such as refraining from producing additional output data, refraining from relying on recently produced output data, logging events, shutting down, operating in a restricted access mode, and/or the like. As another example, the remedial action could include causing a machine learning model using the second set of data to be retrained.

Some implementations of method 400 further include generating a second set of clusters from the second set of vector representations (e.g., different than the first set of clusters). In some instances, the second set of clusters can be generated in response to a request to update the baseline. Some implementations of method 400 further include determining a statistical property associated with each cluster from the second set of clusters to generate a second set of statistical properties. The statistical property could be, for example, a center, mean, or range. Some implementations of method 400 further include receiving a third set of data having dimensionality greater than the predetermined value, the third set of data different than the first set of data and the second set of data. Some implementations of method 400 further include generating a third set of vector representations from the third set of data using the vectorization model, the third set of vector representations having dimensionality not greater than the predetermined value. Some implementations of method 400 further include associating, using the second set of statistical properties and to generate a distribution associated with the third set of vector representations, each vector representation from the third set of vector representations to a cluster from the second set of clusters (e.g., and not a cluster from the first set of clusters).

Some implementations of method 400 further include receiving a third set of data having dimensionality greater than the predetermined value, the third set of data different than the first set of data and the second set of data. Some implementations of method 400 further include generating a third set of vector representations from the third set of data using the vectorization model, the third set of vector representations having dimensionality not greater than the predetermined value. Some implementations of method 400 further include associating, using the set of statistical properties and to generate a distribution associated with the third set of vector representations, each vector representation from the third set of vector representations to a cluster from the set of clusters. In such a scenario, the second set of vector representations and the third set of vector representations are both associated to a cluster from the set of clusters.

In some implementations of method 400, the distribution associated with the first set of vector representations is a first histogram and the distribution associated with the second set of vector representations is a second histogram. The first and second histogram can include the same number/size of bins.

In some implementations of method 400, the first set of data was received from a first remote compute device, and the second set of data was received from a second remote compute device different than the first remote compute device. Although advantages and disadvantages exist, one potential advantage of receiving data from multiple remote compute devices is separation of the first and second sets of data (e.g., for privacy). Another potential advantage of receiving data from multiple compute devices is that the first remote compute device can be used for a first task (e.g., training a model) and second remote compute device can be used for a second task (e.g., using a deployed model). In some implementations of method 400, the first set of data and the second set of data are received from the same compute device.

Some implementations of method 400 further include receiving, after determining the statistical property associated with each cluster from the set of clusters to generate the set of statistical properties, a datapoint having dimensionality greater than the predetermined value. Some implementations of method 400 further include generating, in response to receiving the datapoint, a vector representation from the datapoint using the vectorization model, the vector representation having dimensionality not greater than the predetermined value. Some implementations of method 400 further include determining, based on a comparison between the vector representation and the set of statistical properties, that the datapoint is an outlier. Upon determining that the datapoint is an outlier, a remedial action can occur, such as refraining from using the datapoint, flagging the datapoint, modifying an impact of the datapoint, and/or the like.

In some implementations of method 400, the first set of vector representations and the second set of vector representations are each a set of high dimensional vector representations.

FIG. 5 show a flowchart of a method 500 for causing a remedial action in response to detecting a data drift exceeding a data drift threshold, according to an embodiment. In some implementations, method 500 can be performed by a processor (e.g., processor 112).

At 501, a set of clusters (e.g., set of clusters 120) is generated from a first set of vector representations (e.g., set of vector representations 118A). The first set of vector representations are generated from a first set of data (e.g., set of data 116A) using a vectorization model (e.g., vectorization model 126). In some implementations, the first set of data can include only high dimensional data, only low dimensional data, only structured data, only unstructured data, or a combination thereof. In some implementations, the vectorization model is a neural network and/or deep neural network trained using at least one of a self-supervised loss technique or a loss from a downstream task associated with the deep learning neural network. The set of clusters can include any number of clusters such as one or more than one. Each cluster from the set of clusters can be associated with at least one vector from the first set of vector representations. In some implementations, each cluster from the set of clusters can be associated with at least two vectors from the first set of vector representations.

At 502, a statistical property associated with each cluster from the set of clusters is determined to generate a set of statistical properties (e.g., set of statistical properties 122). Examples of statistical properties can include the center, mean, range, and/or the like. In some implementations, step 502 is performed automatically (e.g., without requiring additional human input) in response to completing step 501.

At 503, each vector representation from the first set of vector representations is associated to a cluster from the set of clusters using the set of statistical properties to generate a distribution (e.g., distribution 124A) associated with the first set of vector representations. In some implementations, the set of statistical properties indicate centers of clusters from the set of clusters, and each vector representation from the first set of vector representations is associated to the cluster whose center is most similar to (e.g., closest in the vector space) that vector representation; such information is represented by the distribution associated with the first set of vector representations. In some implementations, step 503 is performed automatically (e.g., without requiring additional human input) in response to completing step 502.

At 504, each vector representation from a second set of vector representations (e.g., set of vector representations 118B) is associated to a cluster from the set of clusters using the set of statistical properties to generate a distribution (e.g., distribution 124A) associated with the second set of vectors. The second set of vector representations are different than the first set of vector representations. The second set of vector representations are generated from a second set of data different than the first set of data using the vectorization model. In some implementations, the second set of data can include only high dimensional data, only low dimensional data, only structured data, only unstructured data, or a combination thereof. In some implementations, 504 occurs a predetermined amount of time after 503 (e.g., one hour, 12 hours, one day, one week, one month, three months, six months, one year, etc.). In some implementations, 504 occurs automatically (e.g., in substantially real time and without requiring human intervention) after the second set of data has been generated. In some implementations, the set of statistical properties indicate centers of clusters from the set of clusters, and each vector representation from the second set of vector representation is associated to the cluster whose center is most similar to (e.g., closest in the vector space) that vector representation; such information is represented by the distribution associated with the second set of vectors.

At 505, the distribution associated with the first set of vector representations is compared with the distribution associated with the second set of vector representations. In some implementations, the at least one of Jensen-Shannon divergence, Earth Mover's Distance, Wasserstein metric, or Kullback-Leibler divergence is used to compare the distribution associated with the first set of vector representations with the distribution associated with the second set of vector representations. In some implementations, step 505 is performed automatically (e.g., without requiring additional human input) in response to completing step 504.

At 506, data drift between the first set of vector representations and the second set of vector representations is detected based on a comparison of the distribution associated with the first set of vector representations with the distribution associated with the second set of vector representations at 505. In some implementations, step 506 is performed automatically (e.g., without requiring additional human input) in response to completing step 505.

At 507, transmission of a signal is caused, in response to the data drift exceeding a data drift threshold, to cause a remedial action. With reference to FIG. 1, the signal could be transmitted to the data drift detection device 110, user compute device 150, and/or a compute device not shown in FIG. 1.

In some implementations of method 500, the first set of data was used during a training phase of a machine learning model (e.g., machine learning model 156), the second set of data was used during a production phase of the machine learning model, and the machine learning model is a natural language processing machine learning model. In some implementations of method 500, the first set of data was used during a training phase of a machine learning model, the second set of data was used during a production phase of the machine learning model, and the machine learning model is a computer vision machine learning model.

In some implementations of method 500, the set of clusters is a first set of clusters and the set of statistical properties is a first set of statistical properties. Some implementations of method 500 can further include generating a second set of clusters from the second set of vector representations. Some implementations of method 500 can further include determining a statistical property associated with each cluster from the second set of clusters to generate a second set of statistical properties. Some implementations of method 500 can further include associating, using the second set of statistical properties and to generate a distribution associated with a third set of vector representations, each vector representation from the third set of vector representations to a cluster from the second set of clusters (e.g., and not a cluster from the first set of clusters). In some implementations of method 500, the data drift is greater than a predetermined amount of data drift. Some implementations of method 500 can further include confirming that the data drift is greater than the predetermined amount of data drift, the second set of clusters being generated from the second set of vector representations in response to confirming that the data drift is greater than the predetermined amount of data drift.

In some implementations of method 500, the set of clusters is a first set of clusters and the set of statistical properties is a first set of statistical properties. Some implementations of method 500 can further include associating, using the first set of statistical properties and to generate a distribution associated with a third set of vector representations, each vector representation from the third set of vector representations to a cluster from the set of clusters. Some implementations of method 500 can further include comparing the distribution associated with the first set of vector representations with the distribution associated with the third set of vector representations. Some implementations of method 500 can further include detecting data drift between the first set of vector representations and the third set of vector representations in response to comparing the distribution associated with the first set of vector representations with the distribution associated with the third set of vector representations. Some implementations of method 500 can further include generating a second set of clusters from at least one of the second set of vector representations or the third set of vector representations in response to detecting data drift between (1) the first set of vector representations and the second set of vector representations, and (2) the first set of vector representations and the third set of vector representations. Some implementations of method 500 can further include determining a statistical property associated with each cluster from the second set of clusters to generate a second set of statistical properties. Some implementations of method 500 can further include associating, using the second set of statistical properties and to generate a distribution associated with a fourth set of vector representations, each vector representation from the fourth set of vector representations to a cluster from the second set of clusters.

In some implementations of method 500, the first set of vector representations and the second set of vector representations are each a set of high dimensional vector representations.

FIG. 6 show a flowchart of a method 600 for determining a set of divergence metrics associated with sets of vector representations, according to an embodiment. In some implementations, method 600 can be performed by a processor (e.g., processor 112).

At 601, a set of clusters (e.g., set of clusters 120) are identified from a first set of vector representations (e.g., set of vector representations 118A). In some implementations, the first set of vector representations have dimensionality less than a predetermined threshold value. In some instances, using vector representations can enable data drift to be detected with respect to data represented by the vector representations that otherwise may not have been detected if vector representations were not generated/used. Additionally, in some instances, using vector representations can reduce complexity, storage requirements, and/or computing power used (e.g., by data drift detection compute device 110, described below) to detect data drift with respect to data represented by the vector representations. Additionally, in some instances, vector representations can account for semantic similarity, thereby allowing similarity and/or dissimilarity in meaning between text to be identified.

At 602, a center associated with each cluster from the set of clusters is determined to generate a set of centers (e.g., set of statistical properties 122). Each center from the set of centers could indicate a substantially center portion of a cluster from the set of clusters, and each cluster from the set of clusters can be associated with a center from the set of centers. In some implementations, 602 is performed automatically (e.g., without requiring additional human input) in response to completing 601.

At 603, a determination is made, for each vector representation from the first set of vector representations and to generate a first set of distributions, a distribution of that vector representation that (1) is included in the first set of distributions and (2) indicates, for each center from the set of centers, similarity between that vector representation and that center. For example, each vector representation from the first set of vector representations can be associated with multiple distance values indicating distance between that vector representation and the set of centers. In some implementations, 603 is performed automatically (e.g., without requiring additional human input) in response to completing 602.

At 604, a determination is made, for each vector representation from a second set of vector representations and to generate a second set of distributions, where a distribution of that vector representation that (1) is included in the second set of vector representations and (2) indicates, for each center from the set of centers, similarity between that vector representation and that center. For example, each vector representation from the second set of vector representations can be associated with multiple distance values indicating distance between that vector representation and the set of centers. In some implementations, 604 occurs a predetermined amount of time after 603 (e.g., one hour, 12 hours, one day, one week, one month, three months, six months, one year, etc.). In some implementations, the second set of vector representations are generated from a set of data (e.g., set of data 116B), and 604 occurs automatically (e.g., in substantially real time and without requiring human intervention) after the set of data has been generated.

At 605, a set of divergence metrics associated with the first set of vector representations and the second set of vector representations are computed based on comparing the first set of distributions and the second set of distributions. In some implementations, the set of divergence metrics are detected using at least one of Jensen-Shannon divergence, Earth Mover's Distance, Wasserstein metric, or Kullback-Leibler divergence. In some implementations, step 605 is performed automatically (e.g., without requiring additional human input) in response to completing step 604.

In some implementations of method 600, the first set of distributions can indicate total and/or average distance between each center from the set of centers to each vector representation from the first set of vector representations, and the second set of distributions can indicate total and/or average distance between each center from the set of centers to each vector representation from the second set of vector representations. Therefore, the first and second sets of distributions, if represented visually, may have a format similar to those of charts 206 and 212 from FIGS. 2A and 2B.

In some implementations of method 600, for each center from the set of centers, the similarity for that center is a semantic similarity. Therefore, even if texts represented by two vector representations are completely different, the two vector representations may still remain close in a vector space if the semantic similarities are similar.

In some implementations of method 600, the first set of vector representations is generated from a first set of high dimensional data (e.g., set of data 116A) using a vectorization model (e.g., vectorization model 126), and the second set of vector representations generated from a second set of high dimensional data (e.g., set of data 116B) different than the first set of data using the vectorization model.

Some implementations of method 600 further include receiving a first set of unstructured data from a first remote compute device, the first set of vector representations extracted from the first set of unstructured data. Some implementations of method 600 further include receiving a second set of unstructured data from a second remote compute device, the second set of vector representations extracted from the second set of unstructured data. The first and second remote compute devices can be the same device or different devices.

In some implementations of method 600, the set of clusters have a predetermined number of clusters. For example, some implementations of method 600 further include receiving an indication of the predetermined number of clusters prior to identifying the set of clusters from the first set of vector representations. In some instances, the predetermined number of clusters indicated by a user using an input device (e.g., mouse, keyboard, touchscreen, etc.).

Some implementations of method 600 further include receiving an indication of a minimum number of vector representations from the first set of vector representations required to form a cluster. The minimum number can be indicated from a user and/or user device. Each cluster from the set of clusters can include a count of vector representations from the first set of vector representations not less than the minimum number.

In some implementations of method 600, the first set of vector representations and the second set of vector representations are each a set of high dimensional vector representations.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A method, comprising:
receiving a first set of data having dimensionality greater than a predetermined value;
generating a first set of vector representations from the first set of data using a vectorization model, the first set of vector representations having dimensionality not greater than the predetermined value;
generating a set of clusters from the first set of vector representations;
determining a statistical property associated with each cluster from the set of clusters to generate a set of statistical properties;
associating, using the set of statistical properties and to generate a distribution associated with the first set of vector representations, each vector representation from the first set of vector representations to a cluster from the set of clusters;
receiving a second set of data having dimensionality greater than the predetermined value, the second set of data different than the first set of data;
generating a second set of vector representations from the second set of data using the vectorization model, the second set of vector representations not having dimensionality greater than the predetermined value;
associating, using the set of statistical properties and to generate a distribution associated with the second set of vector representations, each vector representation from the second set of vector representations to a cluster from the set of clusters;
detecting, based on a comparison of the distribution associated with the first set of vector representations with the distribution associated with the second set of vector representations, data drift between the first set of vector representations and the second set of vector representations; and
causing transmission of a signal to cause a remedial action in response to the data drift exceeding a data drift threshold.

2. The method of claim 1, wherein the data drift is detected using at least one of Jensen-Shannon divergence, Earth Mover's Distance, Wasserstein metric, or Kullback-Leibler divergence.

3. The method of claim 1, wherein the vectorization model is a deep neural network trained using at least one of a self-supervised loss technique or a loss from a downstream task associated with the deep learning neural network.

4. The method of claim 1, wherein the set of clusters is a first set of clusters and the set of statistical properties is a first set of statistical properties, the method further comprising:
generating a second set of clusters from the second set of vector representations;
determining a statistical property associated with each cluster from the second set of clusters to generate a second set of statistical properties;
receiving a third set of data having dimensionality greater than the predetermined value, the third set of data different than the first set of data and the second set of data;
generating a third set of vector representations from the third set of data using the vectorization model, the third set of vector representations having dimensionality not greater than the predetermined value; and
associating, using the second set of statistical properties and to generate a distribution associated with the third set of vector representations, each vector representation from the third set of vector representations to a cluster from the second set of clusters.

5. The method of claim 1, further comprising:
receiving a third set of data having dimensionality greater than the predetermined value, the third set of data different than the first set of data and the second set of data;
generating a third set of vector representations from the third set of data using the vectorization model, the third set of vector representations having dimensionality not greater than the predetermined value; and
associating, using the set of statistical properties and to generate a distribution associated with the third set of vector representations, each vector representation from the third set of vector representations to a cluster from the set of clusters.

6. The method of claim 1, wherein the distribution associated with the first set of vector representations is a first histogram and the distribution associated with the second set of vector representations is a second histogram.

7. The method of claim 1, wherein the first set of data was received from a first remote compute device, and the second set of data was received from a second remote compute device different than the first remote compute device.

8. The method of claim 1, further comprising:
receiving, after determining the statistical property associated with each cluster from the set of clusters to generate the set of statistical properties, a datapoint having dimensionality greater than the predetermined value;
generating, in response to receiving the datapoint, a vector representation from the datapoint using the vectorization model, the vector representation having dimensionality not greater than the predetermined value; and
determining, based on a comparison between the vector representation and the set of statistical properties, that the datapoint is an outlier.

9. An apparatus, comprising:
a memory; and
a processor operatively coupled to the memory, the processor configured to:
generate a set of clusters from a first set of vector representations, the first set of vector representations generated from a first set of data using a vectorization model;
determine a statistical property associated with each cluster from the set of clusters to generate a set of statistical properties;
associate, using the set of statistical properties and to generate a distribution associated with the first set of vector representations, each vector representation from the first set of vector representations to a cluster from the set of clusters;
associate, using the set of statistical properties and to generate a distribution associated with a second set of vector representations, each vector representation from the second set of vector representations to a cluster from the set of clusters, the second set of vector representations different than the first set of vector representations, the second set of vector representations generated from a second set of data different than the first set of data using the vectorization model;
compare the distribution associated with the first set of vector representations with the distribution associated with the second set of vector representations;

detect, based on a comparison of the distribution associated with the first set of vector representations with the distribution associated with the second set of vector representations, data drift between the first set of vector representations and the second set of vector representations; and cause transmission of a signal to cause a remedial action in response to the data drift exceeding a data drift threshold.

10. The apparatus of claim 9, wherein the first set of data and the second set of data each includes structured data and unstructured data.

11. The apparatus of claim 9, wherein:
the first set of data was used during a training phase of a machine learning model,
the second set of data was used during a production phase of the machine learning model, and
the machine learning model is a natural language processing machine learning model.

12. The apparatus of claim 9, wherein:
the first set of data was used during a training phase of a machine learning model,
the second set of data was used during a production phase of the machine learning model, and
the machine learning model is a computer vision machine learning model.

13. The apparatus of claim 9, wherein the set of clusters is a first set of clusters and the set of statistical properties is a first set of statistical properties, the processor further configured to:
generate a second set of clusters from the second set of vector representations;
determine a statistical property associated with each cluster from the second set of clusters to generate a second set of statistical properties; and
associate, using the second set of statistical properties and to generate a distribution associated with a third set of vector representations, each vector representation from the third set of vector representations to a cluster from the second set of clusters.

14. The apparatus of claim 13, wherein the data drift is greater than a predetermined amount of data drift, the processor further configured to:
confirm that the data drift is greater than the predetermined amount of data drift, the second set of clusters being generated from the second set of vector representations in response to confirming that the data drift is greater than the predetermined amount of data drift.

15. The apparatus of claim 9, wherein the set of clusters is a first set of clusters and the set of statistical properties is a first set of statistical properties, the processor further configured to:
associate, using the first set of statistical properties and to generate a distribution associated with a third set of vector representations, each vector representation from the third set of vector representations to a cluster from the set of clusters;
compare the distribution associated with the first set of vector representations with the distribution associated with the third set of vector representations;
detect data drift between the first set of vector representations and the third set of vector representations in response to comparing the distribution associated with the first set of vector representations with the distribution associated with the third set of vector representations;

generate a second set of clusters from at least one of the second set of vector representations or the third set of vector representations in response to detecting data drift between (1) the first set of vector representations and the second set of vector representations, and (2) the first set of vector representations and the third set of vector representations;
determine a statistical property associated with each cluster from the second set of clusters to generate a second set of statistical properties; and
associate, using the second set of statistical properties and to generate a distribution associated with a fourth set of vector representations, each vector representation from the fourth set of vector representations to a cluster from the second set of clusters.

16. A machine-readable medium storing code representing instructions to be executed by a processor, the code comprising code to cause the processor to:
identify a set of clusters from a first set of vector representations;
determine a center associated with each cluster from the set of clusters to generate a set of centers;
determine, for each vector representation from the first set of vector representations and to generate a first set of distributions, a distribution of that vector representation that (1) is included in the first set of distributions and (2) indicates, for each center from the set of centers, similarity between that vector representation and that center;
determine, for each vector representation from a second set of vector representations and to generate a second set of distributions, a distribution of that vector representation that (1) is included in the second set of vector representations and (2) indicates, for each center from the set of centers, similarity between that vector representation and that center; and
compute a set of divergence metrics associated with the first set of vector representations and the second set of vector representations based on comparing the first set of distributions and the second set of distributions.

17. The machine-readable medium of claim 16, wherein for each center from the set of centers, the similarity for that center is a semantic similarity.

18. The machine-readable medium of claim 16, wherein the first set of vector representations is generated from a first set of high dimensional data using a vectorization model, and the second set of vector representations generated from a second set of high dimensional data different than the first set of high dimensional data using the vectorization model.

19. The non-transitory processor-readable medium of claim 16, wherein the code further comprises code to cause the processor to:
receive a first set of unstructured data from a first remote compute device, the first set of vector representations extracted from the first set of unstructured data; and
receive a second set of unstructured data from a second remote compute device, the second set of vector representations extracted from the second set of unstructured data.

20. The machine-readable medium of claim 16, wherein the set of clusters have a predetermined number of clusters, and the code further comprises code to cause the processor to:
receive an indication of the predetermined number of clusters prior to identifying the set of clusters from the first set of vector representations, the predetermined number of clusters indicated by a user.

21. The non-transitory processor-readable medium of claim 16, wherein the code further comprises code to cause the processor to:

receive an indication of a minimum number of vector representations from the first set of vector representations required to form a cluster, the minimum number indicated from a user device, each cluster from the set of clusters including a count of vector representations from the first set of vector representations not less than the minimum number.

\* \* \* \* \*